(12) United States Patent
Revelis et al.

(10) Patent No.: US 7,464,608 B2
(45) Date of Patent: Dec. 16, 2008

(54) BRAKE TENSION MONITORING ASSEMBLY AND METHOD

(75) Inventors: Peter Revelis, Newmarket (CA); Jerry Zielinski, Oshawa (CA)

(73) Assignee: Ventra Group Inc., Ontario (CA)

( * ) Notice: Subject to any disclaimer, the term of this patent is extended or adjusted under 35 U.S.C. 154(b) by 141 days.

(21) Appl. No.: 11/511,260

(22) Filed: Aug. 29, 2006

(65) Prior Publication Data
US 2007/0068330 A1    Mar. 29, 2007

Related U.S. Application Data

(60) Provisional application No. 60/711,682, filed on Aug. 29, 2005.

(51) Int. Cl.
*G01N 3/08* (2006.01)
(52) U.S. Cl. ............................................. 73/826
(58) Field of Classification Search ................ 73/826; 188/2 D
See application file for complete search history.

(56) References Cited

U.S. PATENT DOCUMENTS

| | | | |
|---|---|---|---|
| 1,498,289 A | 6/1924 | Parsley | |
| 3,943,761 A | 3/1976 | Shoberg et al. | |
| 3,974,713 A * | 8/1976 | Toohey | 74/512 |
| 4,362,053 A | 12/1982 | Barrett | |
| 4,373,402 A | 2/1983 | Barrett | |
| 5,448,928 A | 9/1995 | Harger | |
| 5,787,761 A * | 8/1998 | Wang | 74/535 |
| 5,875,688 A * | 3/1999 | Porter et al. | 74/512 |
| 5,910,194 A | 6/1999 | Cho | |

(Continued)

FOREIGN PATENT DOCUMENTS

EP    1 621 430    2/2006

(Continued)

OTHER PUBLICATIONS

International Search Report in PCT/IB2006/002338, dated May 16, 2007, 3 pages.

(Continued)

*Primary Examiner*—Edward Lefkowitz
*Assistant Examiner*—Octavia Davis
(74) *Attorney, Agent, or Firm*—Pillsbury Winthrop Shaw Pittman LLP

(57) ABSTRACT

A brake cable tension monitoring assembly and method for use with a brake actuator installed in an operative position in a motor vehicle. The tension monitoring assembly for sensing tension applied to at least one brake cable connected to a brake actuator installed in an operative position in a vehicle. The brake actuator including a lever movable in applying and releasing directions and the brake actuator being constructed such that tensioning of the cable forces the lever in the releasing direction. The monitoring assembly including a sensing device including a sensor, the sensing device being removably positioned between the lever and a surface and constructed and arranged to sense the movement of the lever in the releasing direction when the cable is being tensioned while the sensing device directly contacts the lever and the surface. The sensing device includes an element biased by a resilient member such that the sensor is activated upon movement of the element into contact with the sensor, while the element moves against the resilient member.

33 Claims, 2 Drawing Sheets

U.S. PATENT DOCUMENTS

| | | |
|---|---|---|
| 6,023,992 A | 2/2000 | Cameno |
| 6,131,483 A * | 10/2000 | Kuller et al. ................... 74/535 |
| 6,382,048 B1 * | 5/2002 | Youn et al. .................... 74/529 |
| 6,522,967 B1 * | 2/2003 | Pfeil et al. .................... 701/70 |
| 6,575,270 B2 | 6/2003 | Farenden |
| 6,814,189 B2 * | 11/2004 | Mai et al. ................... 188/2 D |
| 6,978,870 B2 * | 12/2005 | Powrozek et al. ........... 188/156 |
| 7,011,188 B2 * | 3/2006 | Scheuring et al. ........... 188/2 D |
| 2002/0070083 A1 | 6/2002 | Farenden |
| 2003/0075001 A1 | 4/2003 | Petrak |
| 2003/0200818 A1 | 10/2003 | Adrian |
| 2003/0227010 A1 | 12/2003 | Petrak |
| 2006/0053938 A1 | 3/2006 | Sullivan |

FOREIGN PATENT DOCUMENTS

| | | |
|---|---|---|
| JP | 11-165617 | 6/1999 |
| JP | 2003-127848 | 5/2003 |

OTHER PUBLICATIONS

Position Switches with M12 Plug Connectors, Euchner product catalogue, May 3, 2004, 11 pages.

Dürr brochure, "Final Assembly Systems Automatic Handbrake Setting," Dürr Somac GmbH, 4 pages.

Schenck Brochure entitled Automatic Hand brake Setting; 2 pages.

* cited by examiner

BRAKE TENSION MONITORING ASSEMBLY AND METHOD

The present application claims priority to U.S. Provisional Application Ser. No. 60/711,682, the entirety of which is incorporated herein by reference.

FIELD OF THE INVENTION

The present invention relates to brake tensioning. More specifically, the present application illustrates embodiments of the present invention, including embodiments relating to a brake tension monitoring assembly and to a method of tensioning a brake.

BACKGROUND

Current methods of adjusting brake cables create unwanted variation in system tension. U.S. Pat. No. 4,373,402 to Barrett, U.S. Patent Application Publication No. US2003/0227010, and EP 1621450A1 and EP1380487B1 disclose methods and apparatus relating to tensioning parking brakes for motor vehicles, each of which is incorporated herein in its entirety by reference.

SUMMARY OF THE INVENTION

One aspect of the invention provides a tension monitoring assembly for sensing tension applied to at least one brake cable connected to a brake actuator installed in an operative position in a passenger compartment of a vehicle. The brake actuator includes a lever movable in applying and releasing directions. The brake actuator is constructed such that tensioning of the cable, during adjustment, forces the lever in the releasing direction towards a surface in the passenger compartment. The assembly comprises a sensing device including a position sensor and an engaging member movable relative to the position sensor. The sensing device is constructed to be removably engaged with the lever with the engaging member engaging the surface in the passenger compartment. The sensing device further comprises a resilient member biasing the engaging member. The engaging member and the resilient member are constructed such that an end portion of the engaging member engages against the surface, and relative movement occurs between the position sensor and the engaging member against the biasing of the spring as the lever is moved in the releasing direction during tensioning of the cable. The position sensor is operable to be activated upon the engaging member reaching a predetermined position relative to the position sensor during the relative movement between the position sensor and the engaging member.

Another aspect of the invention provides a combination, including a vehicle and a tension monitoring assembly. The vehicle has a braking system including at least one brake cable connected to a brake actuator installed in an operative position in a passenger compartment of said vehicle. The brake actuator includes a lever movable in applying and releasing directions. The brake actuator is constructed such that tensioning of the cable during adjustment forces the lever in the releasing direction towards a surface in the passenger compartment. The tension monitoring assembly senses tension applied to the at least one brake cable. The assembly comprises a sensing device including a position sensor and an engaging member movable relative to the position sensor. The sensing device is removably engaged with the lever with the engaging member engaging the surface in the passenger compartment. The sensing device further comprises a resilient member biasing the engaging member. The engaging member and the resilient member are constructed such that an end portion of the engaging member engages against the surface and relative movement occurs between the position sensor and the engaging member against the biasing of the spring as the lever is moved in the releasing direction during tensioning of the cable. The position sensor is operable to be activated upon the engaging member reaching a predetermined position relative to the position sensor during the relative movement between the position sensor and the engaging member.

Another aspect of the invention provides a method of tensioning at least one brake cable connected to a brake actuator installed in an operative position in a passenger compartment of a vehicle. The brake actuator includes a lever movable in applying and releasing directions. The brake actuator is constructed such that tensioning of the cable during adjustment forces the lever in the releasing direction towards a surface in the passenger compartment. The method of tensioning comprises:

providing a sensing device including a position sensor and an engaging member movable relative to the position sensor, the sensing device further comprises a resilient member biasing the engaging member;

engaging the sensing device with the lever and the engaging member with the surface;

tensioning the cable coupled to the lever, the tensioning forcing the lever in the releasing direction toward the surface, the engaging member and the resilient member being constructed such that an end portion of the engaging member engages against the surface and relative movement occurs between the position sensor and the engaging member against the biasing of the spring as the lever is moved in the releasing direction during tensioning of the cable; and said position sensor being activated upon said engaging member reaching a predetermined position relative to said position sensor during the relative movement between the position sensor and the engaging member.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DESCRIPTION OF ILLUSTRATED EMBODIMENTS

Figure 1:
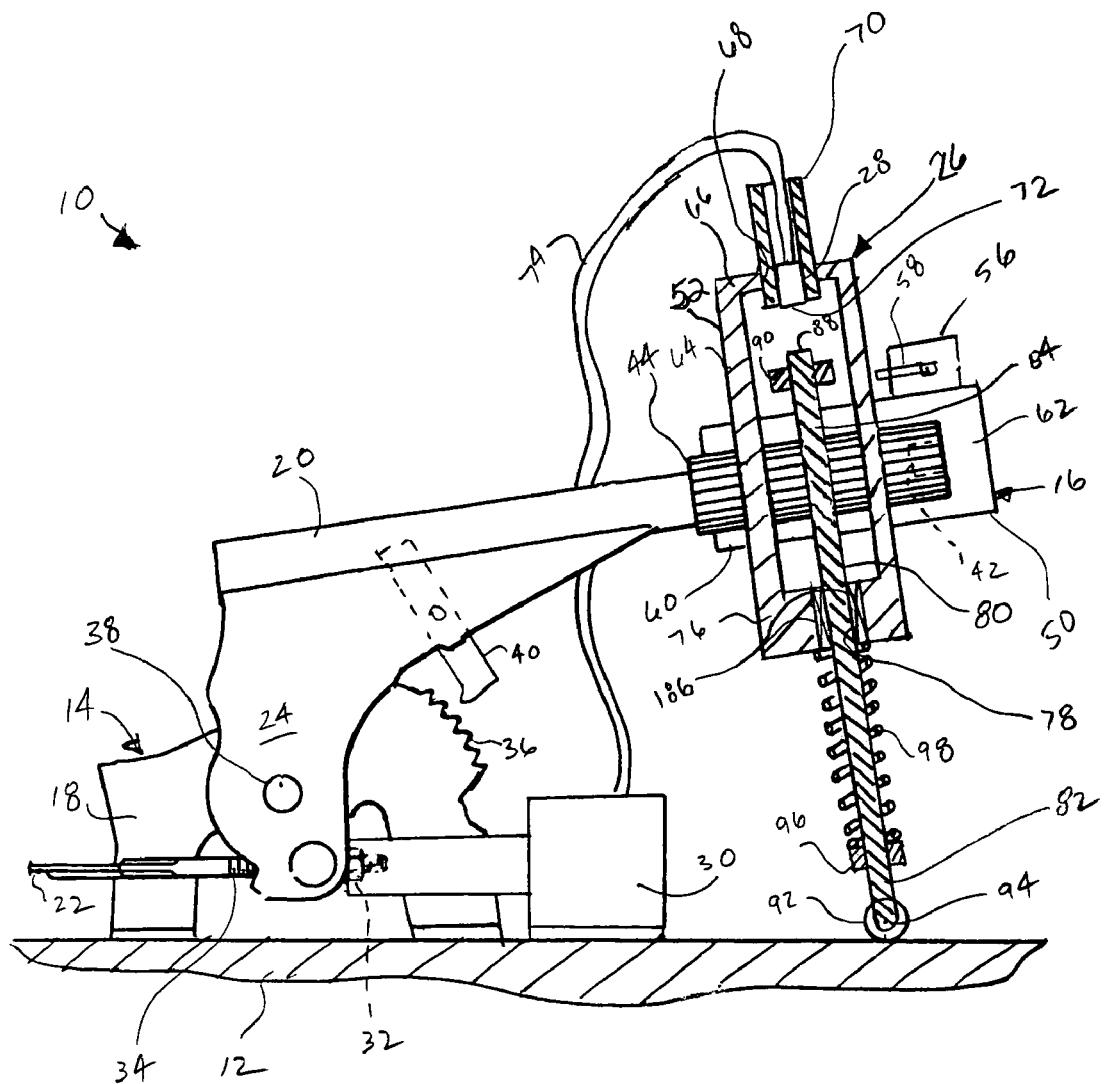
FIG. 1 illustrates a side view of a tensioning system in accordance with one illustrated embodiment of the present invention wherein the load cell is shown cut in half by cross-section.
Figure 2:
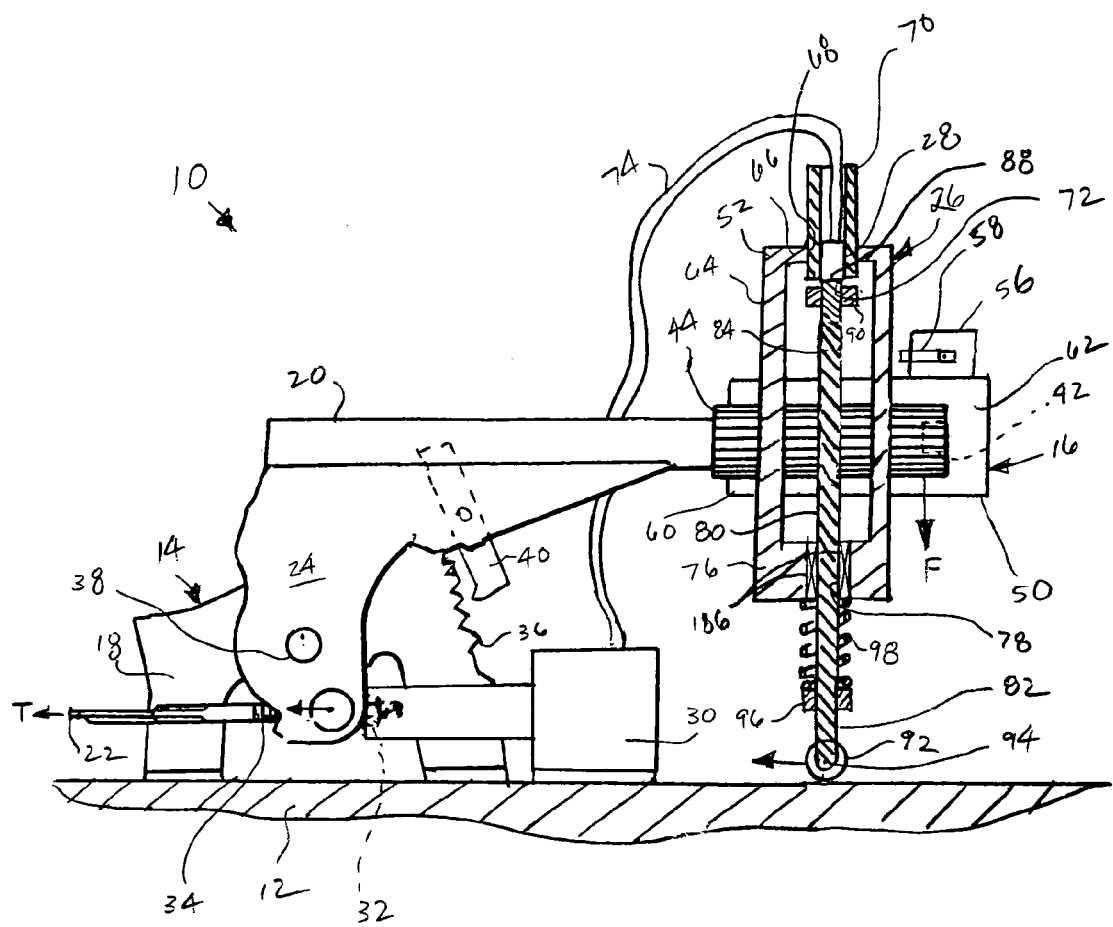
FIG. 2 illustrates a side view of the tensioning system of FIG. 1 wherein the force applied to the handle activates the sensor.

The principles of the invention are applicable in a variety of sensing applications, including cable tensioning applications for hand and foot emergency/parking brakes for motor vehicles. FIGS. 1 and 2 illustrate one embodiment of the present invention in the form of a hand brake tensioning assembly 10 for a motor vehicle. In particular, FIG. 1 illustrates the brake tensioning assembly 10 including a hand brake 14 (i.e., a hand-operated brake actuator). Tension monitoring apparatus is shown at 16.

The hand brake 14 includes a mounting member 18 coupled to a base 12 (which is typically a structural element of the vehicle next to the driver's seat in the vehicle's passenger compartment, such as part of the floor plan). A brake handle or lever 20 is pivotally attached to the mounting member 18, and a brake cable 22 is coupled to one end 24 of the handle 20. Raising the lever 20, in the applying direction, applies tension to the cable 22; and conversely during cable tension adjustment, increased tensioning of the cable 22 forces the handle 20 toward the base 12.

The tension monitoring apparatus 16 includes a sensing device 26 including a position sensor 28. The sensing device 26 is positioned between the handle 20 and a fixed surface, such as the base 12. Although illustrated as being positioned between the handle 20 and the base 12, the sensing device 26 may be positioned between the handle 20 and any other appropriate surface, such as a bracket supporting the hand brake 14. The sensing device 26 is constructed and arranged to sense the movement of the handle 20 as the handle 20 moves in the releasing direction toward the base 12 when the cable 22 is tensioned while the sensing device 26 directly contacts the handle 20 and the base 12.

The tension monitoring apparatus 16 may optionally further include a driving device 30 to physically tension the cable 22. Although illustrated schematically in FIGS. 1 and 2, since the cable 22 for an emergency brake of a motor vehicle is most commonly tensioned by tightening a nut 32 coupled to the cable 22, driving device 30 is preferably in the form of a torque wrench 30 to rotatably drive the nut 32 and, in turn, tension the cable 22. As explained below, the tensioning assembly 10 can be configured such that the torque wrench 30 tensions the cable 22 until stopped by a signal from the sensor 28 after sensor 28 senses a predetermined force from the movement of the handle 20 toward the base 12.

When tensioning a manual parking or emergency brake 14 such as illustrated in FIGS. 1 and 2, nut 32 is run down a threaded rod 34 until the proper tension is reached in the cable 22, which is part of a cable system that is coupled to the wheels of the motor vehicle, and specifically the brake calipers or drum assembly as generally known in the art. Applying the proper tension is important in setting the cable system so that the proper loads are generated when the parking brake 14 is applied in order to hold the motor vehicle securely, for example, on a hill. If the tension in cable 22 is too loose, then the parking brake 14 could run out of travel and apply insufficient braking force to the wheels and fail to keep the motor vehicle stationary, for example, on the hill. If the cable 22 is too tight, wheel drag may be exhibited during regular travel damaging or prematurely wearing components of the wheels and braking system.

In order to provide the proper tension in cable 22, tensioning assembly 10 functions on the premise that as the nut 32 is run down rod 34 and applies tension to cable 22, the reaction from the cable 22 tries to force the handle 20 (or pedal if a foot brake is employed) in the releasing direction back to its original brake released position (often referred to as the home position). In the case of the hand brake illustrated in FIGS. 1 and 2, the tensioning of the cable 22 tries to force the handle 20 down toward base 12. The sensing device 26 monitors the movement of the handle 20 by the cable 22 and shuts off the torque wrench 30 that drives the nut 32 once the desired, predetermined movement of the handle 20 toward the base 12 is reached. This predetermined movement is calculated so that the torque wrench 30 is not shut off until the proper system tension in cable 22 is obtained.

The parking brake 14 illustrated in FIG. 1 is of a type that is generally known in the art for prohibiting movement of vehicle wheels. Parking brake 14 is attached to an appropriate base 12, as commonly done with such hand brakes. Base 12 may be an ordinary support for a parking brake, such as a console between front passenger seats of a motor vehicle. The mounting member 18 of the brake 14 is rigidly secured to base 12 with appropriate fasteners and includes a series of teeth 36. Handle 20 is pivotally connected to mounting member 18 at a pivot point 38 and includes a locking mechanism for releasably locking the handle 20 in a desired position with respect to the mounting member 18. Although various locking mechanisms may be employed, the illustrated locking mechanism includes a pawl 40 for engaging teeth 36. Handle 20 also has a button 42, which activates a mechanism that releases the pawl 40 from the teeth 36 in a known manner when the button 42 is depressed. The handle 20 has a grip 44 for the user to grasp. A lower end 24 of the handle 20 is coupled to the cable 22 in a known manner. In typical operation, an operator grasps the grip 44 and depresses the button 42 while pulling the grip-end of the handle 20 upwardly and rearwardly away from the base 12 in a brake applying direction. This upward and rearward motion of the grip 44 forces the lower end 24 of the handle 20 forward as the handle 20 pivots about pivot point 38. Then, as lower end 24 moves forward, the cable 22 is further tensioned and the brakes are applied to the wheels to stop or prohibit movement of the wheels that are coupled to the brake system attached to cable 22.

The tension monitoring apparatus 16 may take a variety of forms while performing the basic functions of controlling the device 30 that is tensioning the cable 22 by monitoring the movement of the handle 20 in response to the tensioning of the cable 22. As illustrated in FIGS. 1 and 2, the sensing device 26 includes an attaching member 50 for attaching the sensing device to the handle 20 and an assembly 52 for monitoring the movement of the handle 20 toward the base 12. The attaching member 50 is releasably secured to the handle 20 through the use of a clamping mechanism 56 so that when clamped, the attaching member 50 is rigidly secured to the handle 20; and when released, the attaching member 50 can be removed from the handle 20.

Any appropriate clamping mechanism 56 can be used for releasably securing the attaching member 50 to the handle. For example, as illustrated in FIGS. 1 and 2, a toggle clamp 56 may be used. Toggle clamp 56 has a clamp handle 58 for selectively forcing a movable member against the handle 20 to selectively secure and release the attaching member 50 from the handle 20. That is, when the clamp handle 58 is in one position the attaching member can be positioned on the brake handle 20 and when the clamp handle is moved to a second position, a movable member is forced against the brake handle 20 to lock the grip 44 between the movable member and the bottom 60 of the attaching member 50.

Also, a preferred optional feature of the attaching member 50 is the ability to simultaneously depress the button 42 of the handle 20 while the clamping mechanism 56 is secured to the handle 20 so that the pawl 40 is disengaged and the handle 20 will be free to move relative to the mounting member 18 about the pivot point 38. Thus, when the cable 22 applies a force to handle 20, the handle 20 can freely move toward base 12 to permit the monitoring by assembly 52. The depressing of the button 42 may be accomplished by forcing a front section 62 of the attaching member 50 against the button 42 to press the button 42 in while positioning the attaching member 50 on the grip 44. Then, while the button 42 is still depressed by the front section 62, the clamp handle 58 is moved to clamp the attaching member 50 to the grip 44 to keep the button 42 in the depressed position. As seen in dashed lines in FIGS. 1 and 2, button 42 remains depressed by front section 62 while the attaching member 50 is on the grip 44. Attaching member 50 may be made from any appropriate material, including metal.

The assembly 52 is rigidly secured to attaching member 50 in any conventional manner including through the use of fasteners and welding. Also, attaching member 50 and assembly 52 may be integrally formed from a unitary structure. As seen in FIGS. 1 and 2, assembly 52 is cut in half and shown in cross-section to show the inner workings of assembly 52. Although assembly 52 could be a single integral device, the assembly 52 as illustrated is that of a multi-element assembly. In particular assembly 52 includes a frame member 64 that is directly and rigidly connected to the attaching member 50. Frame member may be made of any appropriate material, including metal. An upper end 66 of the illustrated assembly 52 includes a threaded opening 68 for receiving a hollow, threaded rod 70, which, in turn, receives position sensor 28. Position sensor 28 is preferably a contact sensor that activates a switch on contact, such as a plunger switch. However, the sensor 28 may be any type of appropriate sensor that activates upon the approach or contact of the upper contact end 88 of probe 80. For example, the sensor 28 may also be non-mechanical, such as a magnetic or optical switch.

Sensor 28 may be securely positioned to the inside of rod 70 and moved with respect to the upper end 66 along with the movement of the rod 70, such as by turning the rod 70 and screwing the rod 70 either further in or further out of the opening 68. The movement of the rod 70 and sensor 28 provides the ability to adjust the position of the sensor 28 as a way of adjusting the movement of the handle 20 that activates the sensor 28. If the sensor 28 is hard-wired to the torque wrench 30, an electrical connection 74 can extend from the sensor 28 to the torque wrench 30.

The lower end 76 of the frame 64 has an opening 78 for receiving a probe 80 (also referred to as an engaging member). Probe 80 acts as the connection between the sensor 28 and the base 12. Probe 80 may take the form of a longitudinally extending, shaft extending through opening 78 and has a lower end 82 for contacting the base 12 and an upper end 84 for contacting the sensor 28. The longitudinal movement of the probe 80 may be facilitated by bearings 186 positioned in the lower opening 78. At upper end 84, the probe 80 has a contact 88 for activating sensor 28. Probe 80 also has an upper collar 90 at its upper end 84 that will act as a stop for the movement of the probe 80 in the downward direction. That is, the probe 80 will travel downwardly only until the collar 90 abuts the lower end 82 of frame 64. Collar 90 may be adjustable so that the movement of the probe 80 and, thus, the movement of the handle 20 required to activate sensor 28, can be selectively controlled. At its lower end 82, probe 80 may have a roller bearing 92 for contacting the base 12. The roller bearing 92 may permit easier travel of the lower end 82 of the probe 80 against the base 12 than if the probe tip 94 was used by itself. As the handle 20 moves downwardly toward the base 12, the probe tip 94 moves along the base 12 toward the mounting member 18. In the case when an automotive console is the base 12, a roller bearing 92 or other rotatable member will aid in preventing any scratching of the console. Further, the roller bearing 92 keeps the force acting longitudinally through probe 80 instead of causing shearing forces from friction caused by sliding of the probe 80 along the base 12. Of course, alternate configurations are possible, such as configurations wherein a probe tip moves away from mounting member 18, or a probe tip that swivels with respect to handle 20 and does not move toward or away from mounting member 18, but instead remains at a constant distance from mounting member 18.

Lower end of probe 80 also has a lower, adjustable collar 96 that acts as a base for resilient biasing member 98. The adjustable collar 96 also provides a mechanism for adjusting the tension in the biasing member 98. Biasing member 98 biases probe 80 against base 12 and provides a force which must be overcome before probe 80 is permitted to move upwardly toward sensor 28. Thus, the downward movement of the handle 20 in response to the tensioning of cable 22 is dependent upon the handle 20 being forced in the direction F to sufficiently overcome the counteracting force from biasing member 98. Therefore, the movement of the handle 20 depends upon the selection and/or adjusting of the biasing member 98. If the biasing member 98 is made more stiff (i.e., has a higher spring constant), the handle 20 must apply a greater downward force against the biasing member 98 and the tension applied to cable 22 must also be greater. Similarly, if the biasing member 98 is made less stiff (i.e., has a lower spring constant), the handle 20 may apply a lesser downward force against the biasing member 98 and the tension applied to cable 22 may be less.

Resilient biasing member 98 may take various forms, but is illustrated as a metallic compression spring 98 in FIGS. 1 and 2. Therefore, in the illustrated embodiment, the handle 20 moves downwardly in the direction F with sufficient force to overcome the upward force of the compression spring 98. In the illustrated embodiment, if it is desired to change the force applied by the biasing member, the compression spring 98 may be changed, for example, with another compression spring having the desired stiffness. Additionally, the collar 96 may be adjusted to selectively compress or relieve the spring 98 to further change the characteristics of the spring 98 and, thus, the biasing force applied against the handle 20, without switching out the spring 98 for another. Of course various biasing members 98 and corresponding adjusting mechanism may be used. For example, biasing members 98 may be solid, resilient members, and multiple resilient members may be used of the same type or of various types. Still further, the biasing member 98 may be selectively controlled by a computer monitoring the movement of the handle 20 and controlling the tensioning of the cable.

As mentioned above, torque wrench 30 may take the form of any appropriate mechanism to tighten cable 22. The cable 22 is illustrated as being tighten by a nut 32 and the torque wrench 30 is therefore adapted to turn the nut to tighten or loosen the nut 32 as desired and can take the form of any appropriate torque wrench. The torque wrench 30 can be hard-wired to sensor 28 via electrical wires 74 or coupled to sensor 28 by other connections, such as by a wireless connection. Regardless, the electrical connection between the sensor 28 and the torque wrench 30 is of ordinary construction and arrangement in order for the sensor 28 to deactivate the torque wrench 30 when the sensor 28 is activated. That is, when the upper contact 88 of the probe 80 pushes the plunger switch 72 sufficiently to activate the switch, an electronic signal is sent that deactivates the torque wrench 30. Both torque wrench 30 and sensor 28 may be appropriately powered by electrical circuitry as generally known in the art. Torque wrench 30 can be handheld or otherwise held or mounted to appropriately turn nut 32. For example, torque wrench 30 may be mounted to a robotic arm or positioned on base 12.

The operation of the tensioning assembly 10 is as follows. The assembly 52 is locked onto the grip 44 of the parking brake handle 20 through the use of attaching member 50. As mentioned above, the attaching member 50 will simultaneously depress the button 42 of the parking brake handle 20. When the button 42 is depressed, the pawl locking mechanism inside the parking brake 14 is effectively disabled as the pawl 40 is disengaged from the teeth 36. Thus, the handle 20 of the parking brake 14 is free to move up and down. Once the assembly 52 is secured on the grip 44, the torque wrench 30 is used to drive the adjustment nut 32 until cable 22 begins to tension. The tension developed in cable 22 by driving the adjustment nut 32 is consistently proportional to the position of the handle 20 relative to the base 12 (and is related to the force applied to compress the spring 98). Thus, by placing the assembly 52 on the handle 20 to monitor the movement of the handle 20 and allowing the assembly 52 to communicate with the torque wrench 30 used to drive the nut 32, the torque wrench 30 can be stopped at a specified position of the handle 20 contacting sensor 28. Hence, the preferred torque wrench 30 can be consistently stopped at a specified cable tension. The ultimate goal of the tensioning assembly 10 is to set the correct tension for the parking brake 14 such that the brakes do not drag and such that the "feel" of handle 20 is stiff while pulling and not loose in the home position (when the brakes are not applied). As such, the tensioning assembly 10 couples the torque wrench 30 with the sensor 28 to consistently set the correct tension in the cable 22 of parking brake 14 system to any predetermined value.

Additional devices may be added to the tensioning assembly 10, including a controlling device such as a computer controller. For example, a computer controller can automatically activate the torque wrench 30, then monitor the sensor 28 until the sensor 28 activates upon contact with probe 80. Then, the computer controller can send a signal deactivating the torque wrench 30. Of course, this can all be done remotely or using wireless technology as well as using a hard-wired system.

As seen in FIGS. 1 and 2, the assembly 52 shown, uses a plunger-type switch 72, which is situated inside the threaded rod 70. The threaded rod 70 is allowed to change its vertical position via its threads and its threaded engagement within threaded opening 68. As the probe 80 is housed inside linear motion bearings 186, the probe 80 is permitted to move up and down freely. The load spring 98 compresses when a force on the handle 20 from cable 22 sufficiently forces the grip end of the handle 20 to move toward the base 12. The two shaft collars 90 and 96 on the probe 80 allow the probe .80 to be constrained relative to the frame 64. When a sufficient downward force is developed in the handle 22 of the parking brake 14 from the cable 22 due to driving the nut 32 with the torque wrench 30, the probe 80, which contacts the console 12 of the vehicle, will react against the console 12 and compress the load spring 98 against the frame 64. As the load spring 98 is compressing, the probe will travel axially up toward the plunger switch 28 where, as seen in FIG. 2, at a specified handle position, the upper contact 88 of probe 80 will trip the switch 72 and turn off the torque wrench 30. Additionally, the handle position at which the sensor 28 is activated, can be adjusted, if desired, by the movement of the sensor 28 relative to the probe 88, such as, for example, via movement of the threaded rod 70 in which the sensor or switch 72 is housed. Further, the biasing force created by biasing member 98 may be adjusted as described above.

In FIG. 1 the assembly 52 has been rigidly secured to the grip 44 of handle 20 via clamping device 50 and the since the button 42 has been depressed by front section 62, the handle 20 is capable of freely pivoting relative to mounting member 18. Also, the tip 94 of probe 80 is brought into contact with base 12. The tensioning of cable 22 may not have yet started in FIG. 1.

In FIG. 2, the tensioning of cable 22 has begun by the application of torque wrench 30 against nut 32 to tension cable 22 to create a tension T in the direction away from the handle 20 as signified by arrow T. The tension T applied to cable 22 acts to pivot handle 20 about pivot point 38 such that the lower end 24 moves in the direction of the tension T and the end of handle 20 with grip 44 moves forward and downwardly in the brake releasing direction toward base 12 in a direction F as indicated by arrow F. As handle 20 moves downward towards base 12, the probe 80 moves closer to sensor 28. Although, more accurately, as the roller 92 is engaged against base 12, the sensor 28 is moving toward the probe 80 since the sensor 28 is rigidly mounted to the handle 20 via the clamping device 50. Thus, the sensor 28 is moving downwardly towards the upper contact 88 of the probe 80. The movement of the handle 20 downward toward the base 12 also requires the handle 20 to overcome the force of the spring 98, which can be set to a predetermined force, as desired, as described above. In FIG. 2, the movement of handle 20 is sufficient to compress spring 98 and force probe 80 into contact with sensor 28 after the predetermined movement of handle 20 relative to the selected reference point, i.e., base 12. Therefore, as shown in FIG. 2, a signal may be sent from the sensor 28 via wires 74 to deactivate torque wrench 30.

Of course, other monitoring devices may be employed in order to monitor the force of the handle 20 toward the base 12. For example, instead of sensor 28 being a contact switch as illustrated, the sensor 28 can be a distance measuring device that measures the actual distance handle 20 moves relative to a selected reference point and sends the actual distance measurement to a computer controlled apparatus that monitors the system. As the computer system monitors the movement of the handle 20, once the handle 20 achieves a certain, predetermined position relative to the reference point, the computer could send a signal to deactivate the torque wrench 30. Also, the computer system may monitor and adjust the biasing force of the biasing member 98. Communication between the sensor 28 and the torque wrench 30 may use, for example, a hard-wired connection.

Thus, tensioning assemblies as disclosed herein, such as brake tensioning assembly 10, present a cost-effective, more efficiently designed, and more reliable device and method for accurately tensioning devices.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A tension monitoring assembly for sensing tension applied to at least one brake cable connected to a brake actuator installed in an operative position in a passenger compartment of a vehicle, the brake actuator including a lever movable in applying and releasing directions, the brake actuator being constructed such that tensioning of the cable during adjustment forces the lever in the releasing direction towards a fixed surface in the passenger compartment, the assembly comprising:

a sensing device including a position sensor and an engaging member movable relative to the position sensor, the sensing device being constructed to be removably engaged with the lever with the engaging member engaging the fixed surface in the passenger compartment;

said sensing device further comprising a resilient member biasing the engaging member, the engaging member and the resilient member being constructed such that an end portion of the engaging member engages against the fixed surface and relative movement occurs between the position sensor and the engaging member against the biasing of the spring as the lever is moved in the releasing direction during tensioning of the cable, said position sensor being operable to be activated upon said engaging member reaching a predetermined position relative to said position sensor during the relative movement between the position sensor and the engaging member.

2. An assembly according to claim 1, wherein
said sensor is a contact sensor and is activated upon said engaging member contacting said contact sensor at said predetermined position.

3. An assembly according to claim 1, wherein
said resilient member is a spring and said sensor is a plunger switch.

4. An assembly according to claim 1, wherein
said sensing device includes an adjusting mechanism to change the physical configuration of said sensing device.

5. An assembly according to claim 4, wherein
said adjusting mechanism includes an adjustable connector coupled to said sensor.

6. An assembly according to claim 5, wherein
said adjusting mechanism includes a threaded element housing said sensor and said sensor having threads and being movably coupled along said threaded element.

7. An assembly according to claim 4, wherein
said adjusting mechanism includes an adjustable connector coupled to said resilient member.

8. An assembly according to claim 7, wherein
said resilient member is a compression spring and said adjustable connector is a threaded fastener coupled to a threaded element supporting said compression spring.

9. An assembly according to claim 4, wherein
said adjusting mechanism includes an adjustable stop on said element.

10. An assembly according to claim 1, wherein
said engaging member biased by said resilient member includes a bearing on one end of said element to facilitate movement of said engaging member relative to the fixed surface.

11. An assembly according to claim 10, wherein
said bearing is a roller bearing.

12. A combination, including a vehicle and a tension monitoring assembly, said combination comprising:
a vehicle having a braking system including at least one brake cable connected to a brake actuator installed in an operative position in a passenger compartment of said vehicle, said brake actuator including a lever movable in applying and releasing directions, said brake actuator being constructed such that tensioning of said cable during adjustment forces said lever in the releasing direction towards a fixed surface in the passenger compartment; and
a tension monitoring assembly for sensing tension applied to said at least one brake cable, the assembly comprising:
a sensing device including a position sensor and an engaging member movable relative to the position sensor, the sensing device being constructed to be removably engaged with the lever with the engaging member engaging the fixed surface in the passenger compartment;
said sensing device further comprising a resilient member biasing the engaging member, the engaging member and the resilient member being constructed such that an end portion of the engaging member engages against the fixed surface and relative movement occurs between the position sensor and the engaging member against the biasing of the spring as the lever is moved in the releasing direction during tensioning of the cable,
said position sensor being operable to be activated upon said engaging member reaching a predetermined position relative to said position sensor during the relative movement between the position sensor and the engaging member.

13. A combination according to claim 12, wherein
said fixed surface is a part of said vehicle.

14. A combination according to claim 13, wherein
said part of said vehicle is a console of a vehicle.

15. A combination according to claim 12, further comprising:
a nut for tensioning said cable.

16. A combination according to claim 15, further comprising:
a torque wrench for tightening said nut.

17. A combination according to claim 12, wherein
said engaging member is an elongated rod.

18. A combination according to claim 12, wherein
said lever includes a button and said sensing device depresses said button.

19. A combination according to claim 12, further comprising:
a cable tensioning device; and
a controller mechanism connecting said sensor with said cable tensioning device, said controller mechanism constructed and arranged to receive a signal from said sensor and send a signal to said cable tensioning device.

20. A combination according to claim 19, wherein
said cable tensioning device is a torque wrench.

21. A method of tensioning a brake for use with a brake actuator installed in an operative position in a passenger compartment of a vehicle, the brake actuator being connected to at least one brake cable and including a lever movable in applying and releasing directions, the brake actuator being constructed such that tensioning of the cable during adjustment forces the lever in the releasing direction towards a fixed surface in the passenger compartment, the method of tensioning comprising:
providing a sensing device including a position sensor and an engaging member movable relative to the position sensor, said sensing device further comprising a resilient member biasing the engaging member;
engaging the sensing device with the lever and the engaging member with the fixed surface;
tensioning the cable coupled to the lever, the tensioning forcing the lever in the releasing direction toward the fixed surface, the engaging member and the resilient member being constructed such that an end portion of the engaging member engages against the fixed surface and relative movement occurs between the position sensor and the engaging member against the biasing of the spring as the lever is moved in the releasing direction during tensioning of the cable; and
said position sensor being activated upon said engaging member reaching a predetermined position relative to said position sensor during the relative movement between the position sensor and the engaging member.

22. A method according to claim 21, wherein
the engaging the sensing device with the lever includes pressing a button to free the lever.

23. A method according to claim 21, wherein
the engaging of the sensing device with the lever includes mounting the sensing device on the lever.

24. A method according to claim 21, further comprising:
stopping the tensioning of the cable when the position sensor is activated.

25. A method according to claim 21, wherein
the position sensor is a contact sensor and is activated by contact with the engaging member.

26. A method according to claim 21, further comprising:
adjusting the resilient member to change the tensioning on the cable.

27. A method according to claim 26, wherein
the adjusting of the resilient member includes adjusting a spring.

28. A method according to claim 21, further comprising:
adjusting the position of the sensor to adjust the movement necessary for activating the sensor.

29. A method according to claim 28, wherein
the adjusting the position of the sensor includes turning the sensor with a threaded element.

30. A tension monitoring assembly for sensing tension applied to at least one brake cable connected to a brake actuator installed in an operative position in a passenger compartment of a vehicle, the brake actuator including a lever movable in applying and releasing directions, the brake actuator being constructed such that tensioning of the cable during adjustment forces the lever in the releasing direction towards a fixed surface in the passenger compartment, the assembly comprising:

a first part removably engageable with the lever and a second part removably engageable with the fixed surface in the vehicle passenger compartment, the first and second parts being movable relative to one another as the lever is moved in the releasing direction, a position sensor on one of the first and second parts;

a resilient member constructed to bias the first and second parts such that, when the first and second parts are removably engaged with the lever and the surface in the vehicle passenger compartment, relative movement occurs between the first and second parts against the biasing of the spring as the lever is moved in the releasing direction during tensioning of the cable, said position sensor being operable to be activated upon said first and second parts reaching a predetermined position relative to said position sensor during the relative movement.

31. A tension monitoring assembly according to claim 1, further comprising a rotatable member mounted to an end portion of the engaging member for rollingly engaging the fixed surface.

32. A combination according to claim 12, further comprising a rotatable member mounted to an end portion of the engaging member for rollingly engaging the fixed surface.

33. A method according to claim 21, wherein the engaging member further comprises further comprising a rotatable member mounted to an end portion of the engaging member for rollingly engaging the fixed surface, and said engaging the lever with the fixed surface includes engaging the roller with the fixed surface.

* * * * *